United States Patent [19]

Sorrell et al.

[11] Patent Number: 4,543,822

[45] Date of Patent: Oct. 1, 1985

[54] ELECTROMAGNETIC SHEARFLOWMETER FOR REMOTE OCEANIC APPLICATIONS

[75] Inventors: Furman Y. Sorrell, Raleigh, N.C.; Thomas B. Curtin, Arlington, Va.; Michael D. Feezor, Chapel Hill, N.C.

[73] Assignee: Seametrics, Inc., Raleigh, N.C.

[21] Appl. No.: 559,188

[22] Filed: Dec. 7, 1983

[51] Int. Cl.[4] .......................... G01P 5/08; G01F 1/60
[52] U.S. Cl. .................................. 73/170 A; 73/189; 73/861.12; 73/861.15
[58] Field of Search ................ 73/170 A, 189, 861.12, 73/861.15, 861.16, 861.17

[56] References Cited

U.S. PATENT DOCUMENTS

| | | | |
|---|---|---|---|
| 3,693,440 | 9/1972 | Olson | 73/861.15 |
| 3,722,274 | 3/1973 | Natens et al. | 73/861.16 |
| 4,050,301 | 9/1977 | Cushing | 73/861.17 X |
| 4,121,454 | 10/1978 | Cushing | 73/861.12 |
| 4,170,133 | 10/1979 | Gardner | 73/861.16 |

FOREIGN PATENT DOCUMENTS 0962029 2/1975 Canada .............................. 73/170 A

OTHER PUBLICATIONS

Heldebrandt et al., "The Development and Testing of Current Meters . . . Shelf", Conference: Oceans '78–The Ocean Challenge, Wash., D.C., Sep. 1978, pp. 308–314.

Higley et al., "New Mooring Design for a Telemetering Offshore . . . Buoy", Conference: Oceans '78–The Ocean Challenge, Wash., D.C., Sep. 1978, pp. 10–17.

Primary Examiner—Charles A. Ruehl
Attorney, Agent, or Firm—John E. Leonarz

[57] ABSTRACT

An electromagnetic shearflowmeter for remote oceanic applications is disclosed, wherein a pair of housings, each having disposed therein an electric coil, are spaced to define an open cylinder through which a fluid in which the shearflowmeter is immersed may flow relatively free of obstructions. Electrodes are embedded symmetrically in the surfaces of the housings for sensing electromagnetic signals deriving from activation of the coils and which signals are modified as a function of the rate and direction of flow through the open cylinder of the fluid in which the apparatus is immersed. A plurality of such apparatus may be operated at different depths along a common mooring to measure differentials of flow, also called shear, within the fluid system. An electronic amplification circuit having an excellent common mode-rejection ratio and common mode range, used in conjunction with the other apparatus, is also disclosed.

5 Claims, 8 Drawing Figures

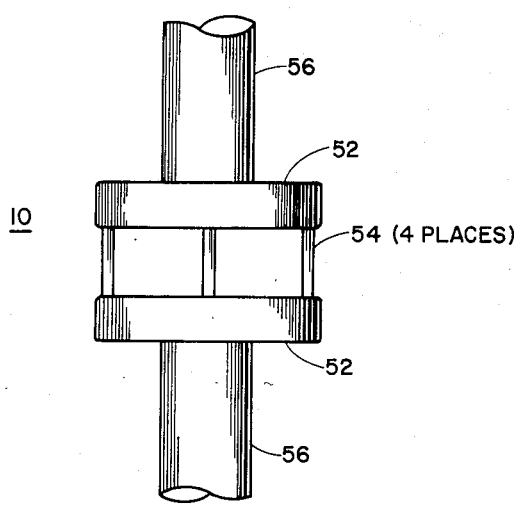
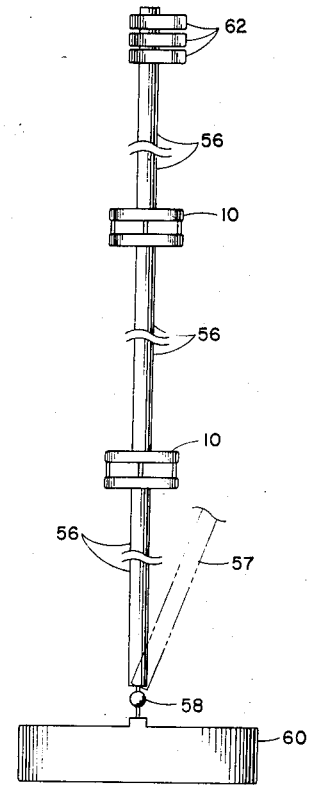
FIGURE 4
FIGURE 5

ELECTROMAGNETIC SHEARFLOWMETER FOR REMOTE OCEANIC APPLICATIONS

BACKGROUND OF THE INVENTION

1. Field of the Invention

This invention relates to the measurement of ocean currents and more particularly to systems of electromagnetic flow meters with improved accuracy and capability.

2. Description of the Prior Art

The problem of measuring ocean currents at various depths simultaneously in order to obtain a consistent and reliable model of water circulation, presents a challenging set of obstacles. Aside from the standard difficulties of shipboard deployment, one must deal with limited power supplies, the tendencies of materials to corrode when left for several months in contact with sea water, the physical beating which oceans apply to apparatus left therein, in electrical measurements, the substantial interferences which arise from the varied electromechanical and electrochemical activities of sea water in contact with sensors, and most importantly, the extremely weak levels of signals obtained from the relatively slow passage of sea water through a relatively low-powered magnetic field of an electromagnetic sensor.

An important problem is that the physical structure of measuring apparatus may itself deflect currents in the vicinity of measurement sensors so that subsequent data handling must include means for correcting such systematic deflections. Aside from the potential for introducing errors in the correction process, changes in flow velocities of the water may have unanticipated actions around the structure which may yield still further inaccuracies. The open cage construction of Olson's electromagnetic flowmeter, U.S. Pat. No. 3,693,440, wherein a uniform magnetic field is created over a cylinder of water by a pair of Helmholtz coils (which themselves define the cylinder) with measuring electrodes disposed within the cylinder for reading the voltage differential, illustrates one solution to the problem under discussion. Water flows freely through the cylinder substantially undistorted from the general flow of which it is a representative part, and (but for such distortion as might be introduced by the electrodes and their support apparatus) useful signals may thereby be obtained.

The electronic problems of seagoing flowmeters are also significant. Standard electrodes, for reasons inherent to the structure of various prior art flowmeters, protrude into the water stream where they not only introduce turbulence (which modifies the very flow they seek to record) but also offer plentiful opportunities for encountering aquatic life forms which may attach to the electrodes, altering their properties and even rendering them inoperative within relatively short periods.

The faces of electrodes in sea water tend to become tiny batteries as dipole molecules, attracted by unavoidable static charges, line up along their surfaces. Potentials of such batteries can be in the range of one to ten millivolts, highly variable with changes in temperature, local pressure, the chemical composition of the electrode and the sea water, and simple mechanical activity of the water against the dipole layer which lies in contact with the electrode surface. It is important that signal-processing apparatus attempting to read the electrical activity created by the passing water currents, be substantially unaffected by electrochemical potential differences which appear as a time varying DC offset. These voltages can be of similar or larger magnitudes compared with the very weak flow-generated signals which the flowmeter is to detect and report. An otherwise excellent circuit, to be discussed in greater detail below in connection with FIG. 1, which would be ideal for interpreting flowmeter data, and which is widely used for data acquisition in situations having relatively stronger input signals, has yielded disappointing results in flowmeter applications because of its substantial DC offset gain, resulting in a relatively poor signal-to-noise ratio.

To get sufficiently strong signals when using this kind of circuit, flowmeters employing it must be kept close to shore or to seaborne support apparatus so that substantial amounts of input power may be supplied. Several attempts at limiting the DC offset gain in this circuit have produced unfortunate side effects, primarily in reducing the common-mode rejection ratio and common-mode range.

These capabilities are important in an electromagnetic flow sensor not only because of DC offset problems, but also because of the relatively large electric fields and the consequent large transients developed in the system when the polarity of the magnetic field is reversed. They are also important when testing and calibrating flowmeters in tow tanks, generally located in buildings with background 60 Hz electrical activity, which, while low for most purposes, are of sufficient magnitudes to interfere with electromagnetic oceanic flow meters, considering the kinds of sensitivities they must have.

The prior are includes a widely used, very high input impedance differential amplifier utilizing a differential to single-ended converter which is schematically shown in FIG. 1. When operated at high gain, it provides a high common mode-rejection ratio (CMRR) of approximately 40+20×log (gain), or 120 to 140 dB for a gain of 10E4 to 10E5, together with an extremely high input impedance (10E12 ohms) and a large common-mode range (CMR) equal to only slightly less than the power supply voltage. These specifications are obtained with inexpensive low noise dual operational amplifiers. Unfortunately, this configuration exhibits very high DC offset gain which would amplify the DC offsets produced at the interface between the pickup electrodes and the sea water electrolyte, as well as offsets deriving from the amplifiers themselves.

Various means of reducing the DC offset gain in this circuit have been attempted, but they tend to result in severe degradation of the CMRR, CMR, or both. One modification of the circuit of FIG. 1 is shown in part in FIG. 2. The differential to single-ended converter of FIG. 1 is the same for all circuits shown herein, consequently, in subsequent figures it is shown with its associated components merely as a block. This modification results in loading of the electrode system by resistors 12 and 14, and capacitors 16 and 18. The 1% tolerance of resistors 12 and 14, together with the greater tolerances of capacitors 16, 18, 20, and 22 severely limit the CMRR obtainable by this circuit. Additional unbalances contributed by the unpredictable variation in electrode resistance (200–5,000 ohms) result in conjunction with the input loading effects, in a further reduction of CMRR.

This circuit eliminates the effect of electrode offset potentials, but not the effect of amplification of the input offset potentials of the operational amplifiers. This input stage must therefore operate at a total gain of only 25, which further imposes a limit on CMRR to an expected value of 68 dB, and a worst case of about 60 dB, assuming the use of 1% tolerance resistors. The combination of these limiting factors leads to an overall CMRR of less than 60 dB, which is insufficient in our experience to permit stable and reproducible measurements over the long term in the ocean.

In addition, capacitors 20 and 22 limit the bandwidth of the front end resulting in slow recovery from large transients.

FIG. 3 shows another attempt at coping with the DC offsets. An error signal developed by differential to single-ended converting amplifier 32 and amplifier 34 and an equal voltage of opposite polarity developed by amplifier 36 are applied to the negative summing junctions of input amplifiers 38 and 40 through resistors 42 and 44. This circuit substantially eliminates the effect of unbalanced electrode resistance by connecting the electrodes directly to the high impedance (10E12 ohm) inputs of amplifiers 38 and 40. This circuit requires exact matching of the resistance values of resistors 42 and 44. In a practical instrument the use of 1% resistors would result in an expected CMRR of $20 \times \log(100) = 40$ dB, and a worst case of 34 dB. Use of the more expensive 0.1% tolerance resistors improves these values to 60 and 54 dB, which are not as good as those of the circuit of FIG. 2.

SUMMARY OF THE INVENTION

The electromagnetic flowmeter and shearflowmeter of our invention provides an open cylinder through which a seawater current can pass relatively free of physical distortion. It employs Helmholtz coils to provide a uniform magnetic field through the sensing cylinder, a plurality of electrodes mounted flush into the instrument housing faces which form the upper and lower surfaces of the sensing cylinder, and an electronic amplification circuit having an excellent common mode-rejection ratio and common mode range while using inexpensive components arranged to yield well-formed square waveforms to enable frequent measurements of ocean current flow components to be recorded.

Each flowmeter unit is modular and can be connected with other units to form a shearflowmeter for simultaneous measurement of currents at different depths, which measurements, to the extent of their differences, provide a reading of the shear in the locality of the shearflowmeter. Signals emanating from each unit can be passed through a system bus and collected remotely for storage or further immediate processing, therefore only a minimal set of processing electronics must be built into any one unit

BRIEF DESCRIPTION OF THE DRAWINGS

FIG. 4. General view of one flowmeter.
FIG. 5. General view of the shearflowmeter.

DETAILED DESCRIPTION OF THE PREFERRED EMBODIMENT

Figure 1:
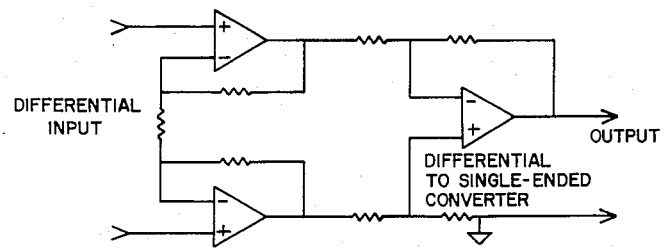
FIGS. 1, 2, and 3. Prior art circuits.
Figure 2:
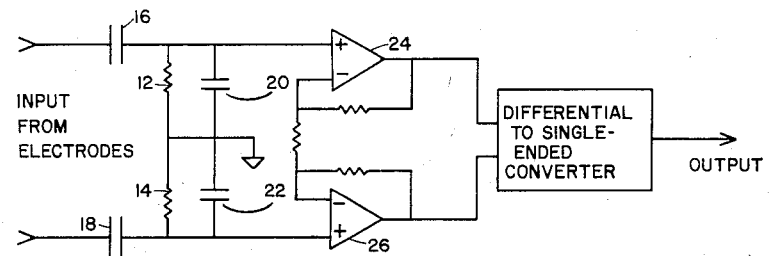
Figure 3:
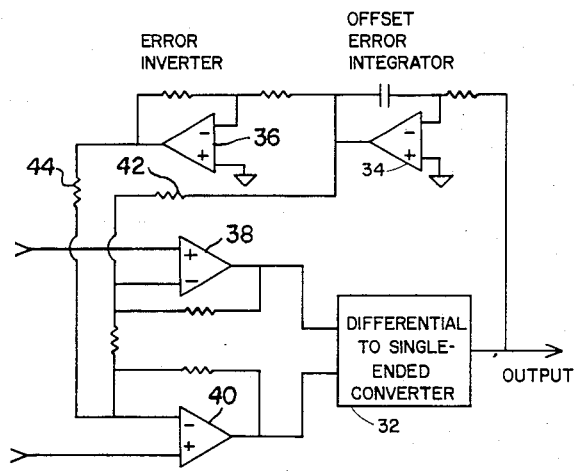

As seen in FIG. 4 an electromagnetic flowmeter 10 of our invention includes a pair of coil housings 52 connected and spaced apart by a plurality, usually four, of struts 54. Connected to the coil housings 52 are mooring sections 56, which connect either to other flowmeters or auxiliary sensor apparatus, or to anchors or buoyancy apparatus designed to hold the place of the flowmeter against a relative movement of a current in which it is immersed.

Referring now to FIG. 5 a shearflowmeter of our invention consists of a plurality of individual flowmeters 10 connected together by a plurality of mooring sections 56 the bottom one of which is pivotably constrained for yielding, but axially nonrotational, movement by the pivot 58, to the anchor 60. Under the influence of a current the shearflowmeter may be nondestructively tilted out of the vertical in the current direction, as is shown by the dashed-line representation 57. To any mooring section, including the topmost section, free streaming buoyancy elements 62 may be added to increase the overall buoyancy and righting moment, but not so much as to disturb the fixing of the anchor 60 against the bottom of the water mass in which current flows are to be measured.

Figure 6:
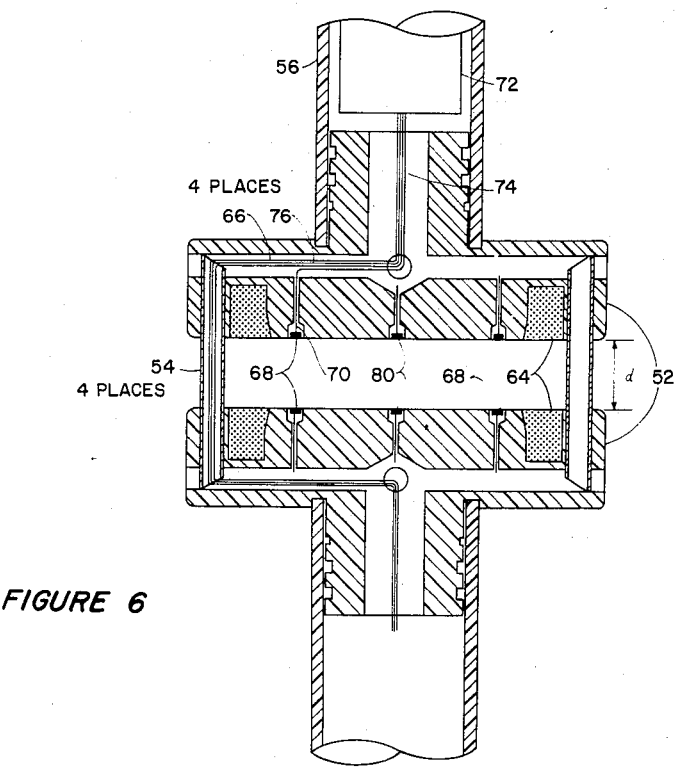
FIG. 6. Cutaway view of the meter showing coils, wires in struts, mooring connections and local electronics.

With reference to FIG. 6, electrodes 68, mounted in the sensor cylinder faces of the housings 52, are connected by means of the wires 70 to signal processing electronics 72 disposed within the mooring sections 56.

Disposed within the mooring sections 56, and continuously extending through the shearflowmeter system, is the system cable 74, which includes the power line wire 66 and the system signal bus wires 76.

The struts 54 have three functions in the flowmeter. By establishing a uniform distance d between the faces of the two housings 52, they serve to establish the distance between the coils 64 necessary to maintain a uniform magnetic field in the flowthrough space. In addition, they serve to hold the two housings together to provide structural cohesion of the overall flowmeter unit, as well as a link in the shearflowmeter structure. Thirdly, the struts serve as protective conduit for the wires 66, 70, and 76 as they pass from the first coil housing across the sensor cylinder into the second coil housing.

The mooring section members 56 are chosen for properties of tensile strength, resistance to corrosion and biofouling, antirotational rigidity or resistance to twisting, and tolerance of slight nonrotational deformations due to action of the fluid in which it is immersed. We have found 2½ inch (nominal) diameter pipe made of polyvinyl chloride (PVC) to be suitable, inexpensive and widely available for upper ocean applications.

The interior arrangements of the flowmeter 10 may be seen with reference to FIG. 6, wherein a pair of coils 64 are disposed within recesses defined respectively by and within the coil housings 52. The coils 64 are formed from and connected together through the struts 54 by the wire 66 which is connected via coil drive electronics to a remote power source, not shown. Those skilled in the electrical arts will perceive that the coils 64 under appropriate power, form a pair of Helmholtz coils which provide a uniform magnetic field in the cylindrical space which lies between them, and through which an unrestricted and substantially unmodified flow of sea water, may pass.

Figure 7:
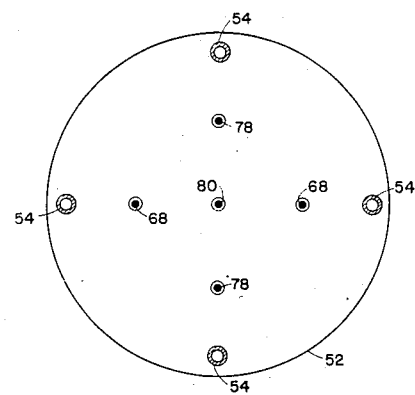
FIG. 7. Section view of coil housing showing electrode placement.

With reference now to FIG. 7, it may be seen that a pair of electrodes 68 are symmetrically arrayed along a line passing through a central point of the housing 52, and that an additional pair of electrodes 78 are similarly arrayed along an additional line equidistant from the electrodes 68. In this case only two pairs of electrodes are present, and the two lines are orthogonal. Other arrangements of electrodes, including possible additional electrodes or angular relationships may be used, if the necessary adjustments in the processing electronics or algorithms are supplied.

It may be seen from FIG. 6 that pairs of electrodes are disposed within the faces of the housings 52 on both faces of the flow sensing cylinder volume, and that only one pair of the electrodes 68 on the lower face (or on the upper face, or one on each face, spaced apart symmetrically about the center to provide differential readings) are actually necessary to sample the voltage drops caused by the flow of fluids through the sensing cylinder. This is because each electrode is wired in parallel with its counterpart in the opposite face, and since all the electrodes are symmetrically arrayed about the center, and because a uniform magnetic field is provided between the coils, both the upper and lower electrodes will sample the same voltage. If either of them becomes impaired, as by an infestation of marine life on an electrode surface, a full signal of voltage will nevertheless be delivered by the counterpart electrode to the processing electronics. Only if both an electrode and its immediate opposite counterpart electrode become fouled would the signal be eliminated. The electrodes are made from a sintered silver-silver chloride mixture, chosen for its equilibrium stability in dilute saline solutions.

The electrodes 68 and 78 are set flush with the surface of the housing 52. That surface is painted with well-known antifouling paints which leach chemicals toxic to fouling organisms into the seawater over a long period, for example, up to six months' effectiveness. By flush mounting the electrodes within the sensing cylinder and releasing antifouling chemicals into the enclosed environment, the tendency for marine life to come to rest on the electrode surfaces is greatly reduced.

Figure 8:
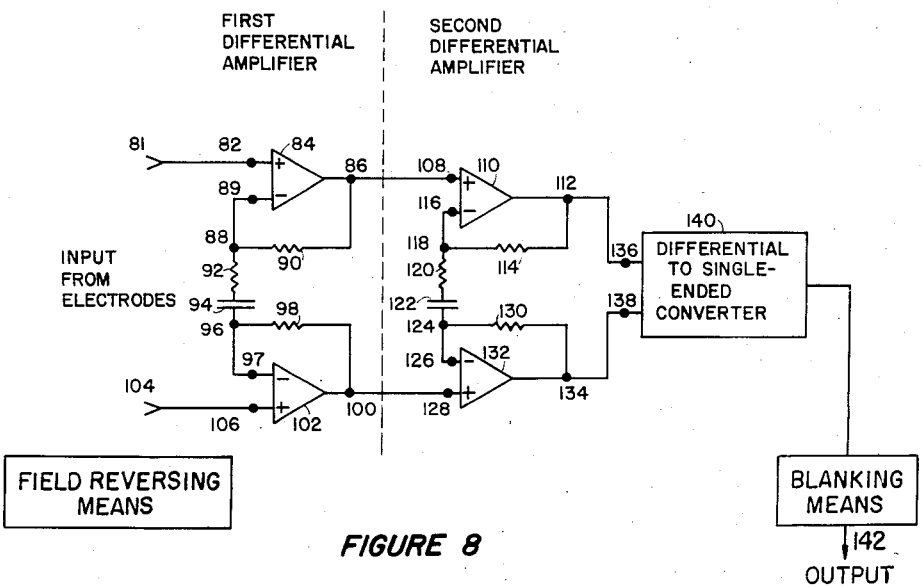
FIG. 8. Circuit diagram of the present invention.

The immediate invention shows as part of the processing electronics 72 a modification of the circuit of FIG. 1, shown in FIG. 8. This modification permits the connection of the very high impedance inputs (10E12 ohms) of amplifiers 84 and 102 directly from the input electrodes, effectively eliminating the effect of even drastic unbalances in electrode resistance. An unbalance of 10E5 ohms, much larger than values rejected in production, still permits a CMRR of 140 dB.

The uniqueness of this circuit is twofold. First, the placement of capacitor 94 between the amplifiers 84 and 102 prevents the undesired amplification of DC offsets developed at the fluid-electrode interface, as well as those produced by the inputs of the amplifiers themselves. This capacitor placement also eliminates the effects of very low frequency electrode potentials generated through the effects of flow and turbulence. These goals are achieved while maintaining exact symmetry in the input circuit, which symmetry is essential to the preservation of the high CMRR and CMR.

The CMRR of this circuit is limited only by the closed loop characteristics of amplifiers 84 and 102, which, through careful circuit design and layout may be made greater than 110 dB in production. The common mode range approaches the value of the power supply voltage.

A second unique feature of the circuit of FIG. 8 results from the addition of a second differential amplification stage connected to the output of the first. This addition consists of amplifiers 110 and 132 and associated passive circuit components including the capacitor 122. This results in a combination having the same high CMRR and CMR, and additionally having a gain-bandwidth product equal to the square of that of the first stage alone, i.e. $3E6 \times 3E6$, or E13 Hz. By distributing the required total gain (E4 to E5) equally between the two differential stages, a bandwidth of 15 kHz to 30 kHz is easily maintained. This bandwidth will pass very clean square waveforms having significant harmonic components below these limits. This wide bandwidth also insures the rapid recovery from transients and overload when the EM flowmeter must be operated in the vicinity of conducting or insulating boundaries such as the walls of tow tanks in which such devices must be calibrated.

In greater detail, then, FIG. 8 is a schematic representation of the circuit. Flow sensing electrodes 68 (not shown), in contact with a flowing fluid medium are connected to inputs 81 and 104 of a first differential stage of the differential amplifier of FIG. 8. This first differential amplifier stage comprises operational amplifiers 84 and 102, together with resistors 90, 92, and 98, and capacitor 94.

Flow-proportional voltage signals are transmitted from circuit inputs 81 and 104 to positive summing junctions 82 and 106. Feedback resistor 90 connected between output 86 and node 88 acts to provide proper input bias for negative summing junction 89 and in conjunction with resistor 92 and capacitor 94 establishes the closed loop gain of amplifier 84. Similarly, feedback resistor 98 connected between output 100 and node 96 acts to provide proper input bias for negative summing junction 97, and in conjunction with resistor 92 and capacitor 94 acts to establish the closed loop gain of amplifier 102. Differential potentials applied to inputs 81 and 104 are transmitted to outputs 86 and 100 with increased magnitude. Common-mode potentials applied to inputs are transmitted to outputs 86 and 100 with unity gain. Capacitor 94 is adapted to interrupt the DC path between amplifiers 84 and 102, resulting in a reduction of gain at lower frequencies, to a limit of unity at DC.

The absence of a ground reference in this circuit results in a common-mode rejection ratio which is independent of the accuracy of passive components 90, 92, 94, and 98, and of the exact properties of amplifiers 84 and 102, which common-mode rejection ratio is proportional only to the differential gain established by passive components 90, 92, 94, and 98.

Provision of a second differential amplifier stage identical in function to the first, comprising amplifiers 110 and 132 and passive components 114, 120, 122, and 130, acts to further increase the strength of differential signals present at outputs 86 and 100 of the first differential stage, and to transmit common mode signals with a gain of unity. Capacitor 122 acts to interrupt the DC path between operational amplifiers 110 and 132 and reduces the low frequency of this second differential amplifier stage to a limit of unity at DC.

The absence of a ground reference involving this second differential amplifier stage results in a common-mode rejection ratio which is directly proportional to the gain of this stage, and is independent of the accuracy of passive components 114, 120, 122, and 130, and of the exact electrical properties of operational amplifiers 110 and 132.

Outputs 112 and 134 of this second stage are applied to differential inputs 136 and 138 of differential-to-single-ended converter 140. This converter which is well known to those skilled in the electronic arts, acts to transmit differential signals applied to inputs 136 and 138 with unity gain to output 140, while reducing common-mode inputs by a factor of 100 or more.

Capacitors 94 and 122 acting respectively in conjunction with resistors 92 and 118 provide a second-order low-frequency cutoff, which discriminates against low frequency noise artifacts produced by turbulence local to the measurement electrodes in contact with the fluid medium, and prevents amplification of the DC offset potentials produced at the electrode-fluid interface and by the operational amplifier offset errors. This action is accomplished without the compromise in common-mode rejection produced by the prior art designs.

Since the common-mode rejection ratio of the first and second stages of the differential amplifier of FIG. 8 is directly proportional to the differential gain produced by these stages, the quality of the amplifier improves with the sensitivity of the measurement required. The extremely large gains demanded by flow measurement allow the amplifier of FIG. 8 to produce its most favorable performance.

In actual operation the magnetic field set up by the Helmholtz coils is caused to reverse by abruptly reversing the voltage applied to them, using switching means well known in the art. This field reversal causes large transient electric fields which persist until the magnetic field stabilizes, which electric fields generally drive the input amplifiers into overload, and which must be prevented from introducing error into the desired flow measurement. This error is effectively prevented by electronically disconnecting, or blanking, the output of the differential-to-single-ended converter from subsequent circuitry for a predetermined period following each magnetic field reversal. This predetermined period is adapted to be long enough for the magnetic field to stabilize and for any amplifier overload condition to subside. After this period the circuit of FIG. 8 together with well-known synchronous demodulating means and low-pass filter smoothing means are adapted to supply a continuous and accurate flow-proportional signal to subsequent recording apparatus, which may be located remotely.

What is claimed is:

1. An electromagnetic flowmeter, comprising:
   at least one pair of electrodes
   disposed about a magnetic field within a conductive fluid for receiving electric pulses responsive to relative motion of said conductive fluid,
   circuit means connected to said electrodes comprising
   at least one pair of operational amplifiers
   each connected to one of said pair of electrodes,
   said operational amplifiers being isolated from ground reference,
   passive electronic components adapted to amplify flow-induced signals, connected to said amplifiers, including a single capacitor between said amplifiers for interrupting DC flow between said amplifiers.

2. The flowmeter of claim 1 further comprising
   means for reversing said magnetic field and
   means for blanking said electric pulses during times associated with reversing of said magnetic field.

3. The flowmeter of claim 2 further comprising
   a second stage of circuit means connected to the first circuit means,
   said second stage comprising an additional pair of operational amplifiers connected to said first pair of operational amplifiers and having additional passive electronic components adapted for further amplification of said signals,
   said additional passive electronic components including a single capacitor for interrupting DC flow between said amplifiers.

4. A shearflowmeter for remote long-term oceanic deployment, comprising:
   a plurality of electromagnetic sensors, each of said sensors defining therein an aperture open for passage of ocean currents substantially free of distortions, and
   said sensors being responsive to said passage of ocean currents to generate signals proportionate to velocities of said ocean currents,
   said sensors being modularly connected mechanically and electrically together by axially rigid connecting means, and
   electrical signal transmitting means in each sensor for transmitting signals from said sensors to remote signal collecting means.

5. In an electromagnetic flowmeter of the kind having pairs of Helmholtz coils for creating a substantially uniform magnetic field between said coils in a region through which fluid currents pass for measurement of the relative velocities of said currents, the improvement comprising:
   housing means enclosing each of said Helmholtz coils and defining a wide aperture between said coils for substantially undistorted passage of said fluid currents through said flowmeter;
   a first set of pairs of electrodes symmetrically disposed within a first part of said housing means and mounted flush with a surface of said housing means adjacent to said aperture for receiving electrical values corresponding to relative velocities of currents passing through said aperture,
   an additional set of pairs of electrodes corresponding to said first set of pairs of electrodes symmetrically disposed within a second surface of said housing means, said second surface being disposed adjacent to said aperture and directly across said aperture from said first surface of said housing means, said additional set of pairs of electrodes being mounted flush with said second surface of said housing means in positions directly corresponding to positions of said first set of pairs of electrodes in said first surface of said housing means, for receiving electrical values identical to those electrical values received by said first set of pairs of electrodes, and
   means for collecting said electrical values.

* * * * *